US010101935B2

(12) United States Patent
Malladi et al.

(10) Patent No.: US 10,101,935 B2
(45) Date of Patent: Oct. 16, 2018

(54) SYSTEM AND METHOD FOR PROVIDING EXPANDABLE AND CONTRACTIBLE MEMORY OVERPROVISIONING

(71) Applicant: SAMSUNG ELECTRONICS CO., LTD., Suwon-si, Gyeonggi-do (KR)

(72) Inventors: Krishna Malladi, San Jose, CA (US); Hongzhong Zheng, Sunnyvale, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 70 days.

(21) Appl. No.: 15/230,322

(22) Filed: Aug. 5, 2016

(65) Prior Publication Data

US 2017/0351453 A1    Dec. 7, 2017

Related U.S. Application Data

(60) Provisional application No. 62/345,702, filed on Jun. 3, 2016.

(51) Int. Cl.
*G06F 13/00* (2006.01)
*G06F 3/06* (2006.01)

(52) U.S. Cl.
CPC .......... *G06F 3/0631* (2013.01); *G06F 3/0604* (2013.01); *G06F 3/0608* (2013.01); *G06F 3/0644* (2013.01); *G06F 3/0661* (2013.01); *G06F 3/0665* (2013.01); *G06F 3/0683* (2013.01)

(58) Field of Classification Search
CPC .... G06F 3/0631; G06F 3/0604; G06F 3/0608; G06F 3/0644; G06F 3/0661; G06F 3/0665; G06F 3/0683
See application file for complete search history.

(56) References Cited

U.S. PATENT DOCUMENTS

| 6,438,560 B1 | 8/2002 | Loen | |
| 6,681,305 B1 * | 1/2004 | Franke | .................. G06F 12/023 711/170 |
| 7,421,533 B2 | 9/2008 | Zimmer et al. | |
| 7,484,208 B1 * | 1/2009 | Nelson | ................ G06F 9/45558 711/6 |

(Continued)

FOREIGN PATENT DOCUMENTS

WO    2015132753 A1    9/2015

OTHER PUBLICATIONS

Nadav Amit et al., "VSWAPPER: A Memory Swapper for Virtualized Environments," ASPLOS '14, Mar. 2014, 17 pages, ACM, Salt Lake City, UT, USA.

(Continued)

*Primary Examiner* — Nanci N Wong
(74) *Attorney, Agent, or Firm* — Innovation Counsel LLP

(57) ABSTRACT

A memory module includes one or more memory devices, a memory interface to a host computer, and a memory overprovisioning logic. The memory overprovisioning logic is configured to monitor memory usage of the one or more memory devices and provide a compression and/or deduplication ratio of the memory module to a kernel driver module of the host computer. The kernel driver module of the host computer is configured to update a virtual memory capacity of the memory module based on the compression and/or deduplication ratio.

19 Claims, 4 Drawing Sheets

(56) References Cited

U.S. PATENT DOCUMENTS

| | | | |
|---|---|---|---|
| 7,650,460 B2 | 1/2010 | Cheriton | |
| 8,065,476 B2 | 11/2011 | Cheriton | |
| 8,230,168 B2 | 7/2012 | Cheriton | |
| 8,504,791 B2 | 8/2013 | Cheriton | |
| 8,612,673 B2 | 12/2013 | Cheriton | |
| 8,938,580 B2 | 1/2015 | Cheriton | |
| 9,311,236 B2 | 4/2016 | Dawson et al. | |
| 9,501,421 B1 | 11/2016 | Cheriton | |
| 9,520,193 B2 | 12/2016 | Cheriton | |
| 2005/0050553 A1* | 3/2005 | Hen | G06F 9/524 719/321 |
| 2005/0071579 A1* | 3/2005 | Luick | G06F 12/04 711/154 |
| 2007/0168624 A1* | 7/2007 | Kaler | G06F 3/0608 711/154 |
| 2008/0104591 A1* | 5/2008 | McCrory | G06F 9/45558 718/1 |
| 2011/0029969 A1 | 2/2011 | Venkataraja et al. | |
| 2013/0275699 A1 | 10/2013 | Cheriton | |
| 2014/0108702 A1* | 4/2014 | Mizushima | G06F 12/0246 711/103 |
| 2015/0019791 A1* | 1/2015 | Yoo | G06F 12/0246 711/102 |
| 2015/0074339 A1 | 3/2015 | Cheriton | |
| 2015/0081954 A1* | 3/2015 | Yamamoto | G06F 17/28 711/103 |
| 2016/0291891 A1 | 10/2016 | Cheriton | |
| 2017/0109049 A1 | 4/2017 | Cheriton | |
| 2017/0123966 A1* | 5/2017 | Miller, Jr. | G06F 12/023 |

OTHER PUBLICATIONS

John Peter Stevenson, "Fine-Grain In-Memory Deduplication for Large-Scale Workloads," a dissertation submitted tot eh Department of Electrical Engineering and the Committee on Graduate Studies of Stanford University, Dec. 2013, 140 pages.

Heiner Litz, et al., "Fine-Grain Memory Deduplication for In-Memory Database Systems," 22 pages.

Yoongu Kim, "HICAMP: Architectural Support for Efficient Concurrency-Safe Shared Structured Data Access," Cheriton et al., ASPLOS 2012, Nov. 18, 2013, 43 pages.

David Cheriton, et al., "HICAMP: Architectural Support for Efficient Concurrency-Safe Shared Structured Data Access," Hicamp Systems, Inc., pp. 287-299.

* cited by examiner

US 10,101,935 B2

SYSTEM AND METHOD FOR PROVIDING EXPANDABLE AND CONTRACTIBLE MEMORY OVERPROVISIONING

CROSS-REFERENCE TO RELATED APPLICATION(S)

This application claims the benefit of and priority to U.S. Provisional Patent Application No. 62/345,702 filed Jun. 3, 2016, the disclosure of which is incorporated herein by reference in its entirety.

TECHNICAL FIELD

The present disclosure relates generally to memory storage systems, more particularly, to a system and method for providing expandable and contractible memory overprovisioning for a memory module.

BACKGROUND

Modern computer systems running applications such as databases, virtual desktop infrastructure, and data analytics have a large main-memory footprint. As systems scale out, the demands for larger data storage capacity increase linearly. While memory technology advances aggressively to meet the growing needs for a large memory having a small footprint, memory module-level techniques such as inline compression or deduplication may be applied to further increase the virtual capacity of a memory module. For example, when exposing a memory capacity to a memory controller, a memory module implemented with an inline compression and/or deduplication can increase its virtual memory capacity as much as 2 to 3 times than its physical memory capacity. The implementation of memory module-level techniques may further require changes to the entire memory system to allow for a system-level control.

Unfortunately, the virtual memory capacity of a memory module that can be increased by inline compression or deduplication depends on the dataset that is being stored in the memory module. While some datasets with redundancy can lend to good compression and deduplication, other datasets may not be suitable for compression or deduplication. In addition, the efficiency for data compression/deduplication changes dynamically during an application runtime as data is modified. The exposure of a dynamically varying virtual capacity of a memory module to applications may need non-trivial changes to the software stack of a computer system. For example, an operating system (OS) of a host computer can accommodate the dynamically varying virtual capacity by closely managing memory paging and swapping to a memory module. However, such modifications require the customization of the OS kernel, making its adaptation difficult and costly.

SUMMARY

According to one embodiment, a memory module includes one or more memory devices, a memory interface to a host computer, and a memory overprovisioning logic. The memory overprovisioning logic is configured to monitor memory usage of the one or more memory devices and provide a compression and/or deduplication ratio of the memory module to a kernel driver module of the host computer. The kernel driver module of the host computer is configured to update a virtual memory capacity of the memory module based on the compression and/or deduplication ratio.

According to another embodiment, a memory system includes a host computer including an operating system (OS) and a kernel driver module, a memory module comprising one or more memory devices and a memory overprovisioning logic, and a memory interface coupling the host computer and the memory module. The memory overprovisioning logic is configured to monitor memory usage of the one or more memory devices and provide a compression and/or deduplication ratio of the memory module to the kernel driver module of the host computer. The kernel driver module of the host computer is configured to update a virtual memory capacity of the memory module based on the compression and/or deduplication ratio According to yet another embodiment, a method includes: providing a memory module including one or more memory devices; providing an initial virtual memory capacity of the memory module; monitoring inline compression and/or deduplication of data written to the memory module based on compression and/or deduplication of data stored in the one or more memory devices of the memory module; providing a compression and/or deduplication ratio of the memory module to a kernel driver module of a host computer; and updating a virtual memory capacity of the memory module based on the compression and/or deduplication ratio.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

Figure 1:
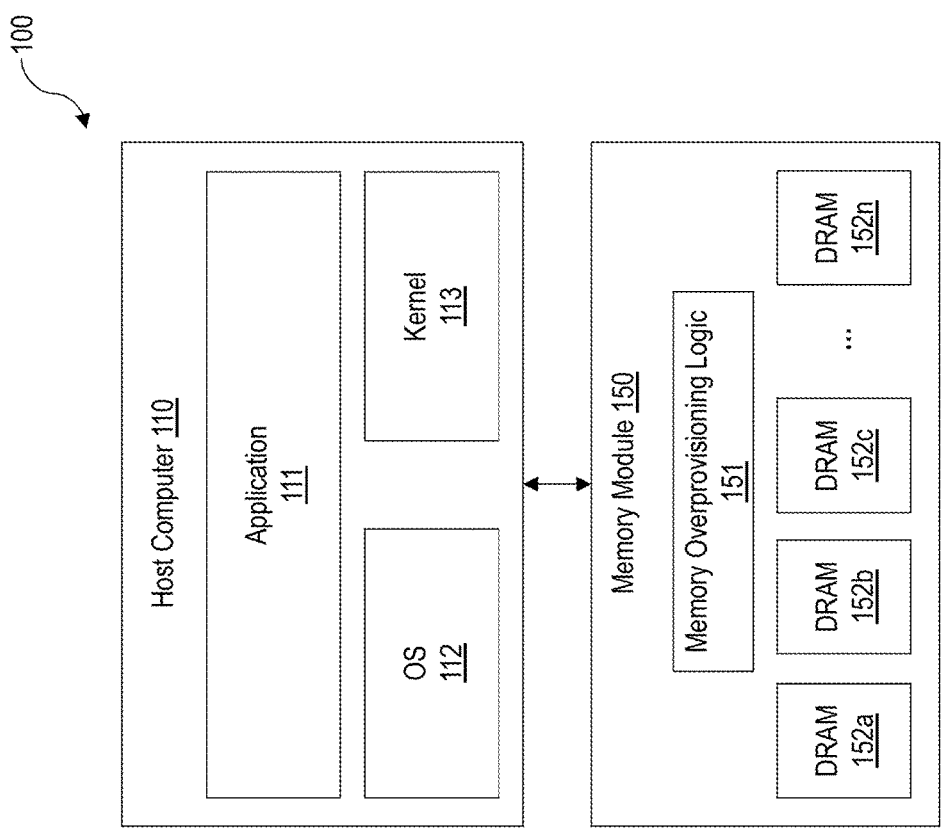
FIG. 1 illustrates a schematic diagram of a system architecture, according to one embodiment.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide expandable and contractible memory overprovisioning. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms presented herein are not inherently related to any particular computer or other apparatus. Various general-purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure provides an expandable and contractible (or puffed-up or puffed-down) overprovisioning of a memory module using a kernel driver module. The terms expandable and contractible represent that the virtual capacity of a memory module can dynamically change to reflect changes in the physical capacity of the memory module with a dynamically varying inline compression and/or deduplication ratio of stored data. The virtual memory capacity of the memory module may change based on the error correction of the stored data. For example, the virtual memory capacity of the memory module exposed to a host computer can be larger than its physical memory capacity when the memory is provisioned as expanded. An expanded virtual memory capacity of the memory module can be contracted as the efficiency of inline compression/deduplication drops. Depending on the dataset stored in the memory module and the efficiency of the inline compression and/or deduplication changes, the virtual memory capacity of the memory module may be dynamically expanded or contracted.

The present memory overprovisioning scheme provides a simple and scalable solution to manage a virtual memory capacity of a memory module. For example, the present memory overprovisioning scheme can make changes mostly in a kernel driver module as opposed to making substantive changes to the operating system (OS) kernel of a host computer. The deployment of the kernel driver module along with memory compression/deduplication hardware can help applications to use the increased virtual memory capacity of the memory module.

The present memory overprovisioning scheme employs an efficient mechanism for expanding (or contracting) a virtual memory capacity available from system-level inline memory compression or deduplication. A memory system with module-level compression/deduplication can advertise a virtual memory capacity of a memory module to the BIOS during boot time as being higher than the physical memory of the memory module. Such optimistic assumptions allow the memory system to overprovision its memory capacity. However, during a runtime, the resident data stored in the memory module could be unfriendly to compression/deduplication, resulting in an unexpected memory shortage. The present memory overprovisioning scheme can modify the kernel system's memory management unit (MMU) to be aware of the details of compression/deduplication and micromanage paging/swapping to the memory module. To avoid significant modifications to the operating system (OS) of a host computer, the present memory overprovisioning scheme employs a scalable kernel driver module that can adjust the virtual memory capacity of the memory module dynamically with feedback from the memory module.

The present memory overprovisioning scheme may exhibit some surface commonalties with a ballooning technique of a virtual machine (VM) environment where a hypervisor reclaims a memory of a virtual machine. However, according to some embodiments of the present disclosure, a memory system with inline compression or deduplication can present a virtual memory capacity that can be dynamically changing and data dependent using a kernel driver module. The present memory system can present the virtual memory capacity of a memory module to a user space. The memory module can reclaim pages as the deduplication/compression efficiency drops, and release pages as the efficiency increases. To achieve this, present memory overprovisioning scheme employs a feedback loop that communicates with the memory module in an implemented logic (e.g., a system on chip (SoC)) that manages data compression/deduplication.

FIG. 1 illustrates a schematic diagram of a system architecture, according to one embodiment. The system 100 includes a host computer 110 and a memory module 150 coupled to the host computer 100 over a memory bus. The host computer 110 has an operating system (OS) 112 and a kernel driver module 113 and can run an application 111 on a user space. In some embodiments, the kernel driver module 113 may be a part of the OS 112. However, the kernel driver module 113 may not be compiled as a part of the kernel of the OS 112. Instead, the kernel driver module 113 can be compiled separately from the kernel of the OS 112 and separately loaded from the kernel of the OS 112, for example, during a runtime. The memory module 150 can include a plurality of dynamic random access memories (DRAMs) 152a-152n and a memory provisioning logic 151. The memory provisioning logic 151 can include a multitude of hardware modules that can track the ratio and also contain management policy limits tables in addition to other buffers to safely receive and place input data exposing a dynamically expandable/contractible virtual memory capacity to the host computer 110.

The present example shows that the memory module 150 includes a plurality of DRAMs 152a-152n, however it is understood that the present memory overprovisioning scheme can be applied to different type of memory device. Examples of such memory devices include, but are not limited to, non-volatile memories such as a flash memory, a phase change memory, a Non-Volatile Dual In-line Memory Module (NVDIMM), and a hybrid NVDIMM.

In the context of virtual machines, a guest OS can be provided with a large physical memory capacity even though the host computer does not have physical pages to accommodate the physical memory capacity when requested by the guest OS. To communicate the memory shortage or availability on the host computer, a balloon driver is loaded in to the guest OS that can inflate and deflate its memory capacity by communicating with a hypervisor running on the host computer.

According to one embodiment, the present memory system includes a plurality of memory modules. Each memory overprovisioning logic of the memory modules collectively report the expanded or contracted virtual memory capacity of the corresponding memory module, and the kernel driver module of the host computer can perform context switching and page reservation based on the dynamically changing virtual memory capacity of the memory modules depending on the compression/deduplication efficiency of data written to the memory modules. In some embodiments, the plurality of memory modules can include one or more non-compressible memory modules and one or more compressible memory modules. The one or more non-compressible memory modules can expose its physical memory capacity whereas the one or more compressible memory modules can expose its virtual memory capacity.

Referring to FIG. 1, the memory provisioning logic 151 of the memory module 150 can observe the efficiency of data deduplication/compression and determine what level of memory overprovisioning is needed. The OS 112 of the host computer 110 does not have to monitor and manage the memory overprovisioning. The memory provisioning logic 151 in conjunction with the kernel driver module 113 can provide a safe way to swap pages to a secondary swap device to avoid a memory-runaway situation when the OS 112 of the host computer 100 overestimates the actual physical memory capacity of the memory module 150. The kernel driver module 113 loaded into the system memory of the host computer 110 can poll the memory availability of the underlying memory module(s) 150 according to the feedback received from the memory provisioning logic 151. The memory provisioning logic 151 of the memory module 150 can set (or contribute to) a target to expand or contract to and provide the feedback on the virtual memory capacity of the memory module 150 to the kernel driver module 113. The OS 112 can provide a consistent view of the memory capacity of the memory module 150 to the application 111 using the feedback for the virtual memory capacity of the memory module 150 provided by the kernel driver module 113.

Figure 2:
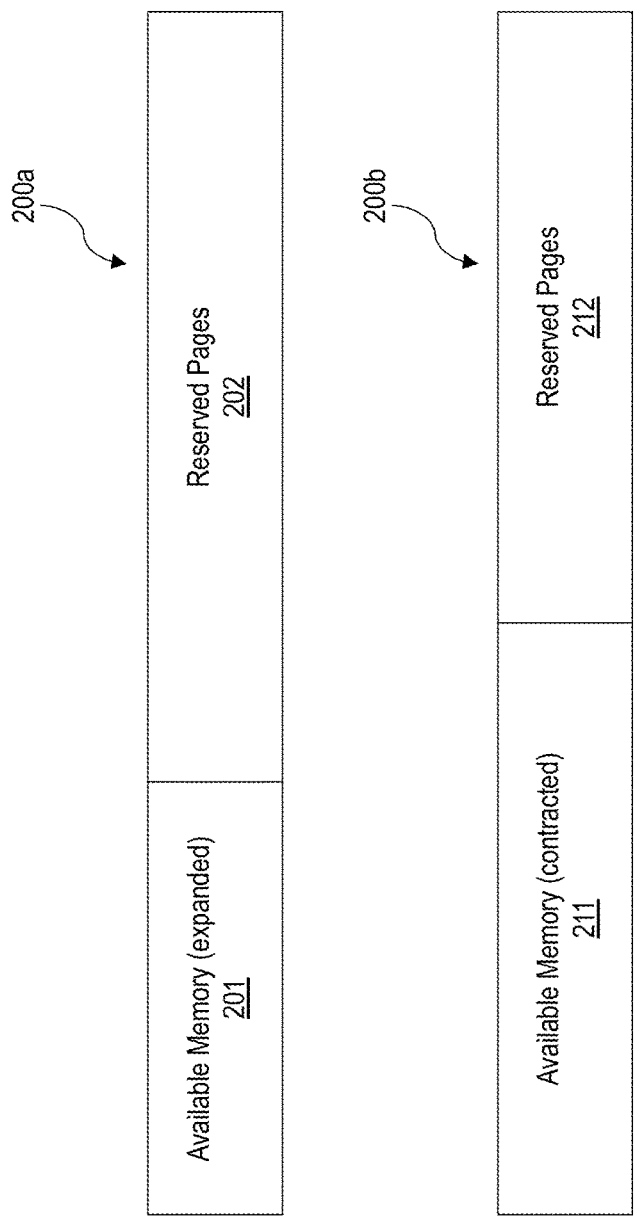
FIG. 2 shows an example view of a dynamically expandable and contractible system memory, according to one embodiment.

FIG. 2 shows an example view of a dynamically expandable and contractible system memory, according to one embodiment. The system memory 200a and 200b respectively represent an expanded and a contracted memory space of a memory module. The memory space of the memory module is divided into reserved pages (e.g., 202 and 212) and pages available in the physical memory (e.g., 201 and 211) that are exposed to the kernel driver module of a host computer. At the startup, a memory provisioning logic of the memory module measures an overprovisioned memory capacity of the memory module. Using the measured overprovisioned memory capacity provided by the kernel driver module, a pool of the system memory 200a is created. When the deduplication/compression efficiency is good, the available physical memory 201 of the memory module can be exposed as expanded such that the virtual memory capacity exposed to the host computer is larger than the available physical memory 201. As the efficiency for deduplication/compression drops, the available physical memory 201 can be contracted to the physical memory 211. The kernel driver module loaded in the system memory of the host computer can reserve system memory pages 212 to prevent applications from using the contracted memory space. When being contracted, the virtual memory of the memory module can be reduced to a contracted physical memory 211, and the reserved pages 212 may correspond to the remaining pages of the system memory 200b.

According to one embodiment, a size of the memory overprovisioning for a memory module is controlled periodically to reflect the efficiency of memory compression/deduplication as shown in FIG. 2. Expansion reserves memory pages and pins the reserved memory pages (e.g., 202) in the system memory (e.g., 200a), allowing excess memory allocations in the OS to be swapped out to a secondary storage such as solid-state drives (SSDs) or hard disk drives (HDDs). Similarly, contraction hands over or releases reserved pages (e.g., 212) to the OS to match the virtual memory capacity of the memory module. The speed of allocation and deallocation can be controlled to safely swap pages.

According to one embodiment, the present memory overprovisioning scheme can be implemented independent of the memory interface. For example, the memory module 150 can be on a double data rate (DDR) interface (e.g., DDR4) with CPU load-stores semantics. In this case, a memory controller of the host computer 110 can support altered timings to accommodate on-module compression/deduplication. For example, the altered timings include the memory access latency and the compression/deduplication logic. For example, with deduplication, the altered timings may include a latency to look up to check if a copy of the memory content is present in the system memory and to make a pointer to the copy. Other latencies include, but are not limited to, latencies of the compression/deduplication logic. In an alternative embodiment, the present memory overprovisioning scheme can be populated on a high-speed interface such as Peripheral Component Interconnect Express (PCIe) with block-based addressing. In the case of PCIe, message-signaled interrupt (MSI) handler can communicate feedback information of the memory overprovisioning. Separate device drivers can handle access to regular uncompressed memories and compression-enabled memories. In either case, the kernel driver module 113 can communicate with the memory provisioning logic 151 of the memory module 150 for providing a consistent memory capacity view. While reserving (expanding) pages, the kernel driver module 113 can request for zeroed reserved pages from the OS 112. Zeroed reserved pages lend to better compression/deduplication by the memory provisioning logic 151, thereby increasing the available memory capacity of the memory module 150.

In case of CPU load-stores, the host computer can perform writebacks to the memory by modifying data transparently to an application using the processor cache. This in turn can change the compression/deduplication ratio of data written to the memory. To provide accurate memory overprovisioning, the kernel driver module 113 can poll in tune with the interface write speed to handle fast changing data. Moreover, the kernel driver module 113 needs to guarantee sufficient secondary swap capacity and speed in order to consistently swap data when the expansion of the virtual memory capacity exceeds the physical memory capacity, forcing swapping of pages. The speed of the expansion/contraction can account for relevant system parameters such as buffer sizes, memory size, speed of memory writes, etc.

The device drivers and kernel drivers of the host computer can have various degree of priorities. According to one embodiment, the kernel driver module 113's scheduling priority can also be set to the highest available degree to perform eager reservation and avoid a memory runaway situation. According to one embodiment, the memory provisioning logic 151 includes an overprovisioning "buffer" to handle excess data in an unforeseen case where the kernel driver module 113 cannot expand in time before the actual memory usage exceeds the available memory.

According to one embodiment, the present memory overprovisioning scheme supports direct memory access (DMA). The kernel driver module of the host computer can handle DMA and remote DMA (RDMA) separately from overprovisioned memory access. In cases of DMA, the kernel driver module can present only its physical memory capacity, not its overprovisioned virtual memory capacity.

According to one embodiment, the present memory overprovisioning scheme provides placement of data in both anonymous and non-anonymous pages in the virtual memory space of the DRAMs. The tiered memory system separating the kernel driver module from the operating system can efficiently manage data placement.

Figure 3:
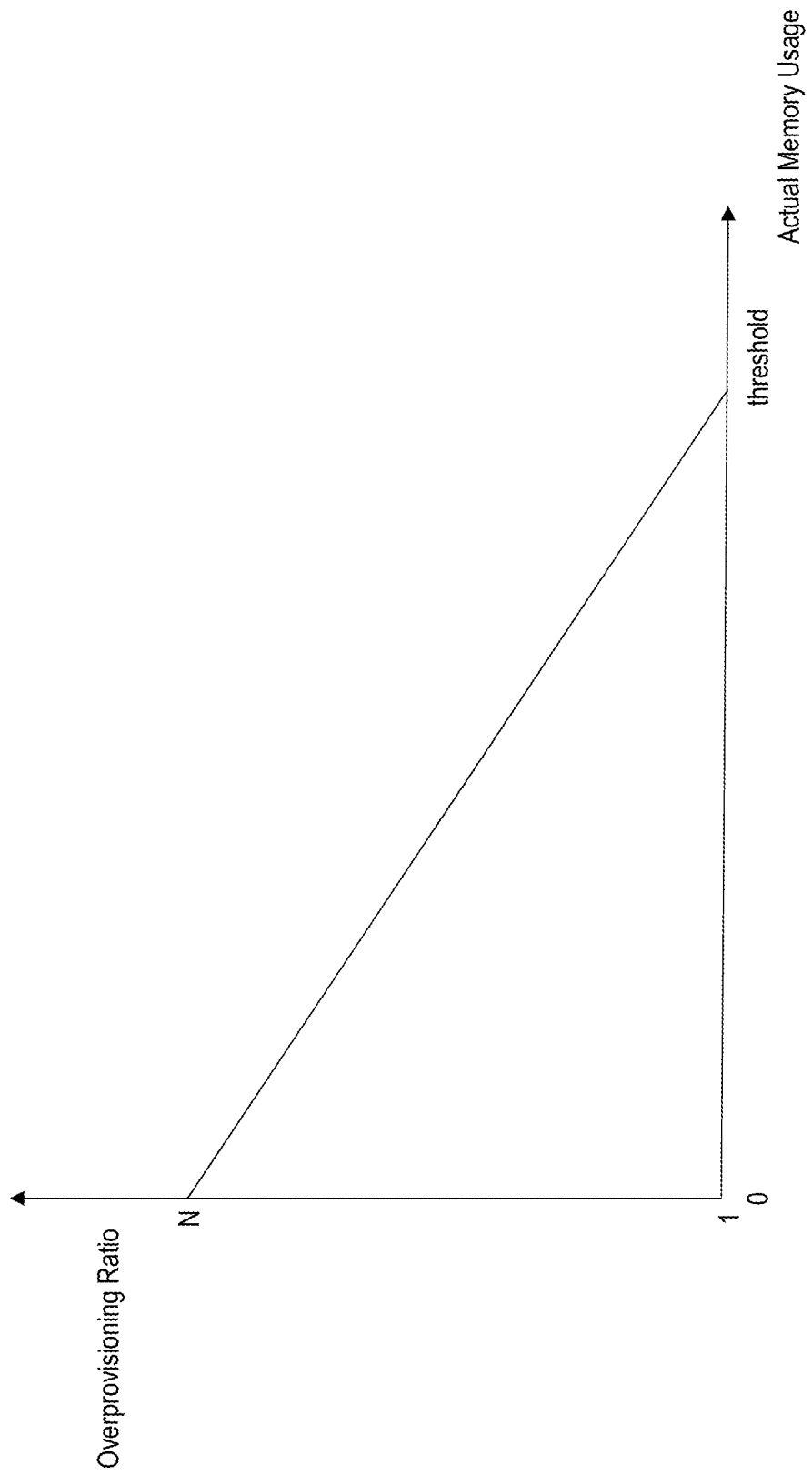
FIG. 3 illustrates an example function of compression/deduplication based system memory usage, according to one embodiment.

As the memory occupancy increases, the memory provisioning logic 151 can reduce the overprovisioning ratio by using a predefined function. The overprovisioning ratio is reduced with the increase of the memory occupancy for, among other reasons, safety from runaway memory demands. FIG. 3 illustrates an example function of compression/deduplication based system memory usage, according to one embodiment. In the present example, the memory provisioning logic 151 of the memory module 150 can report a predetermined maximum deduplication/compression factor of N (N>1). As the memory occupancy increases, the memory provisioning logic 151 in conjunction with the kernel driver module can reduce the overprovisioning ratio down to 1 when the memory usage reaches a memory usage threshold value. According to one embodiment, the memory usage threshold value is programmable.

Figure 4:
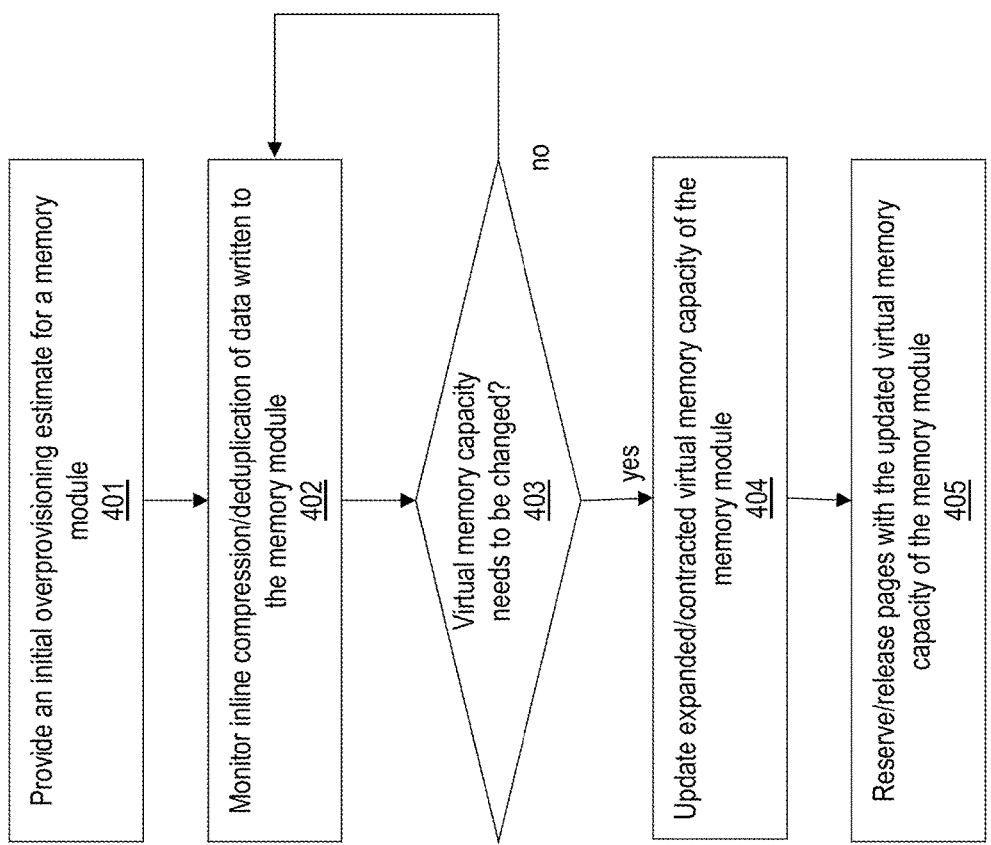
FIG. 4 is a flowchart of an example memory overprovisioning scheme, according to one embodiment.

FIG. 4 is a flowchart of an example memory overprovisioning scheme, according to one embodiment. A memory module can include a memory overprovisioning logic. When the memory system boots, the memory overprovisioning logic can provide an initial overprovisioning estimate to a kernel driver module of a host computer (step 401). For example, the physical memory capacity of the memory module is 128 Giga Byte (GB), but the memory overprovisioning logic exposes the virtual memory capacity of the memory module as 256 GB. After the memory system is booted, the memory overprovisioning logic of the memory module monitors inline compression and/or deduplication of the data written to the memory devices (e.g., DRAMs) of the memory module (step 402). According to one embodiment, the memory overprovisioning logic can monitor the inline compression and/or deduplication of the data periodically. When the compression/deduplication efficiency changes, the kernel driver module determines to change the virtual memory capacity of the memory module exposed to the kernel driver module of the host computer based on the feedback received from the memory overprovisioning logic (step 403). The updated virtual memory capacity of the memory module is exposed to the kernel driver module of the host computer (step 404). The kernel driver module reserves pages from the system memory or releases pages to the OS based on the updated virtual memory capacity of the memory module to match the virtual memory capacity of the memory module (step 405).

The present memory overprovisioning scheme provides a safe and reliable mechanism to deploy inline compression/deduplication on memory modules without extensive modifications to the OS of the host computer. Instead, the kernel driver module that is capable of updating the capacity of the system memory based on the dynamically changing virtual memory capacity of a memory module to user applications is loaded. Changes that are required to the software stack of the host computer to accommodate various types of memory devices (or modules) is minimized because the kernel driver module can accommodate the changes without substantively modifying the OS of the host computer.

According to one embodiment, the present memory overprovisioning scheme can be substantially implemented in a kernel driver module of a host computer that can poll the memory availability from a memory provisioning logic of a memory module. Based on the memory availability of the memory module, the kernel driver module can reserve pages from the system memory or release pages to the OS to match the virtual memory capacity of the memory module. The computing overhead of the kernel driver module can vary depending on the frequency and complexity of the memory overprovisioning. In a worst-case scenario, a safety buffer of the memory provisioning logic can be sized to be less than 1% of the physical memory capacity.

The frequency of the memory overprovisioning can depend on the type of the memory interface (e.g., PCIe and DDR4) and the capacity of the overprovisioning safety buffer. For example, for a PCIe device with four slots with a bandwidth of 4 GB/s and 100% write ratio, approximately 4 MB of data is communicated per every 1 ms. If the safety buffer can hold this amount of data, the frequency of the memory overprovisioning interrupt can be set to be 1 ms or slower.

The complexity of the memory overprovisioning can depend on the complexity of the memory overprovisioning algorithm. A typical memory overprovisioning algorithm can take 1-10 μs. Parameters that can affect the complexity of the memory overprovisioning can include the intelligence of the memory overprovisioning, context switching, page reservation, and other management overhead.

According to one embodiment, the present memory overprovisioning can be substantially implemented in a memory provisioning logic of a memory module. The kernel driver module in conjunction with the memory provisioning logic can make a decision as to how much and/or how often to expand or contract the virtual memory capacity of the memory module. Based on the expanded or contracted virtual memory capacity of the memory module, the kernel driver module can reserve pages from the system memory or release pages to the OS to match the virtual memory capacity of the memory module. According to one embodiment, the memory module can be implemented in a memory system on a DDR4 protocol with a 5× bandwidth, and the overhead for the memory overprovisioning can be limited to be 5% or less.

According to one embodiment, portions of the present memory overprovisioning system can be implemented in a firmware of the memory provisioning logic. The memory provisioning logic can communicate only the size of the memory overprovisioning requirement to the kernel driver module. The kernel driver module can perform expansion or contraction of the memory overprovisioning without additional logic for calculating other parameters such as overprovisioning rate, speed, and transaction data.

According to one embodiment, a memory module includes one or more memory devices, a memory interface to a host computer, and a memory overprovisioning logic. The memory overprovisioning logic is configured to monitor memory usage of the one or more memory devices and provide a compression and/or deduplication ratio of the memory module to a kernel driver module of the host computer. The kernel driver module of the host computer is configured to update a virtual memory capacity of the memory module based on the compression and/or deduplication ratio.

The memory overprovisioning logic may be configured to run a feedback loop to monitor memory usage of the memory module and adjust the virtual memory capacity of the memory module.

The memory overprovisioning logic may be configured to periodically update and report the virtual memory capacity of the memory module to the kernel driver module.

The kernel driver module may be configured to be loaded into a system memory of the host computer and poll memory availability from the memory provisioning logic of the memory module.

The memory interface may be a Peripheral Component Interconnect Express (PCIe) interface or a double data rate (DDR) interface.

The kernel driver module may be configured to reserve or release system memory pages and control available memory to an operating system (OS) to match the virtual memory capacity of the memory module.

According to another embodiment, a memory system includes a host computer, including an operating system (OS) and a kernel driver module, a memory module comprising one or more memory devices and a memory overprovisioning logic, and a memory interface coupling the host computer and the memory module. The memory overprovisioning logic is configured to monitor memory usage of the one or more memory devices and provide a compression and/or deduplication ratio of the memory module to the kernel driver module of the host computer. The kernel driver module of the host computer is configured to update a virtual memory capacity of the memory module based on the compression and/or deduplication ratio.

The memory overprovisioning logic may be configured to run a feedback loop to monitor memory usage of the memory module and adjust the virtual memory capacity of the memory module.

The memory overprovisioning logic may be configured to periodically update and report the virtual memory capacity of the memory module to the kernel driver module.

The kernel driver module may be configured to be loaded into a system memory of the host computer and poll memory availability from the memory provisioning logic of the memory module.

The memory interface may be a PCIe interface or a DDR interface.

The memory provisioning logic may further include a safety buffer for storing additional pages.

The kernel driver module may be configured to reserve or release system memory pages and control available memory to the OS to match the virtual memory capacity of the memory module.

According to yet another embodiment, a method includes: providing a memory module including one or more memory devices; providing an initial virtual memory capacity of the memory module; monitoring inline compression and/or deduplication of data written to the memory module based on compression and/or deduplication of data stored in the one or more memory devices of the memory module; providing a compression and/or deduplication ratio of the memory module to a kernel driver module of a host computer; and updating a virtual memory capacity of the memory module based on the compression and/or deduplication ratio.

The method may further include: running a feedback loop to monitor memory usage of the memory module; and adjusting the virtual memory capacity of the memory module.

The method may further include periodically updating and reporting the virtual memory capacity of the memory module to the kernel driver module.

The method may further include: loading the kernel driver module into a system memory of the host computer; and polling memory availability from the memory provisioning logic of the memory module.

The method may further include: storing reserved pages and pages for available memory in a safety buffer.

The kernel driver module may be configured to reserve or release system memory pages and control available memory to an OS to match the virtual memory capacity of the memory module.

The above example embodiments have been described hereinabove to illustrate various embodiments of implementing a system and method for providing expandable and contractible memory overprovisioning. Various modifications and departures from the disclosed example embodiments will occur to those having ordinary skill in the art. The subject matter that is intended to be within the scope of the invention is set forth in the following claims.

What is claimed is:

1. A method comprising:
providing a memory module including one or more DRAM devices and interfacing with a host computer via a double data rate (DDR) memory interface;
providing an initial virtual memory capacity of the memory module;
monitoring inline compression and/or deduplication of data written to the memory module based on compression and/or deduplication of data stored in the one or more DRAM devices of the memory module;
providing a compression and/or deduplication ratio of the memory module to a kernel driver module of the host computer over the DDR memory interface based on data written to the one or more DRAM devices;
dynamically updating a virtual memory capacity of the memory module based on changes of the compression and/or deduplication ratio;
reserving, using the kernel driver, memory pages in a system memory as the compression and/or deduplication ratio decreases and releasing the memory pages reserved in the system memory to an operating system as the compression and/or deduplication ratio increases to allow the operating system to utilize an amount of memory space corresponding to the virtual memory capacity of the memory module.

2. The method of claim 1, further comprising:
running a feedback loop to monitor the memory usage of the memory module; and
adjusting the virtual memory capacity of the memory module.

3. The method of claim 1, further comprising periodically updating and reporting the virtual memory capacity of the memory module to the kernel driver module.

4. The method of claim 1, further comprising: loading the kernel driver module into the system memory of the host computer; and polling memory availability from the memory provisioning logic of the memory module.

5. The method of claim 1, further comprising storing data received from the host computer in a safety buffer of the memory provisioning logic.

6. The method of claim 1, wherein the kernel driver module is configured to control the amount of memory space corresponding to the virtual memory capacity of the memory module.

7. A memory module comprising:
one or more dynamic random-access memory (DRAM) devices;
a double data rate (DDR) memory interface to a host computer; and
a memory overprovisioning logic,
wherein the memory overprovisioning logic is configured to monitor memory usage of the one or more DRAM devices and provide a compression and/or deduplication ratio of the memory module to a kernel driver module of the host computer over the DDR memory interface based on data written to the one or more DRAM devices,
wherein the kernel driver module of the host computer is configured to dynamically update a virtual memory capacity of the memory module based on changes of the compression and/or deduplication ratio, and
wherein the kernel driver module reserves memory pages in a system memory as the compression and/or deduplication ratio decreases and releases the memory pages reserved in the system memory to an operating system as the compression and/or deduplication ratio increases to allow the operating system to utilize an amount of memory space corresponding to the virtual memory capacity of the memory module.

8. The memory module of claim 7, wherein the memory overprovisioning logic is configured to run a feedback loop to monitor the memory usage of the memory module and adjust the virtual memory capacity of the memory module.

9. The memory module of claim 7, wherein the memory overprovisioning logic is configured to periodically update and report the virtual memory capacity of the memory module to the kernel driver module.

10. The memory module of claim 7, wherein the kernel driver module is configured to be loaded into the system memory of the host computer and poll memory availability from the memory provisioning logic of the memory module.

11. The memory module of claim 7, wherein the kernel driver and a kernel of the operating system are compiled separately from each other.

12. The memory module of claim 7, wherein the kernel driver module is configured to control the amount of memory space corresponding to the virtual memory capacity of the memory module.

13. A memory system comprising:
a host computer including an operating system (OS) and a kernel driver module;
a memory module comprising one or more DRAM devices and a memory overprovisioning logic; and
a double data rate (DDR) memory interface coupling the host computer and the memory module,
wherein the memory overprovisioning logic is configured to monitor memory usage of the one or more DRAM devices and provide a compression and/or deduplication ratio of the memory module to the kernel driver module of the host computer over the DDR memory interface based on data written to the one or more DRAM devices, wherein the kernel driver module of the host computer is configured to dynamically update a virtual memory capacity of the memory module based on changes of the compression and/or deduplication ratio, and
wherein the kernel driver module reserves memory pages in a system memory as the compression and/or deduplication ratio decreases and releases the memory pages reserved in the system memory to the operating system as the compression and/or deduplication ratio increases to allow the operating system to utilize an amount of memory space corresponding to the virtual memory capacity of the memory module.

14. The memory system of claim 13, wherein the memory overprovisioning logic is configured to run a feedback loop to monitor the memory usage of the memory module and adjust the virtual memory capacity of the memory module.

15. The memory system of claim 13, wherein the memory overprovisioning logic is configured to periodically update and report the virtual memory capacity of the memory module to the kernel driver module.

16. The memory system of claim 13, wherein the kernel driver module is configured to be loaded into the system memory of the host computer and poll memory availability from the memory provisioning logic of the memory module.

17. The memory system of claim 13, wherein the kernel driver and a kernel of the operating system are compiled separately from each other.

18. The memory system of claim 13, wherein the memory provisioning logic includes a safety buffer for storing additional pages.

19. The memory system of claim 13, wherein the kernel driver module is configured to control the amount of memory space corresponding to the virtual memory capacity of the memory module.

\* \* \* \* \*